US009667280B2

(12) United States Patent
Shahidi et al.

(10) Patent No.: US 9,667,280 B2
(45) Date of Patent: May 30, 2017

(54) METHODS AND APPARATUS FOR TOUCH TEMPERATURE MANAGEMENT BASED ON POWER DISSIPATION HISTORY

(75) Inventors: Reza Shahidi, San Diego, CA (US); Jon J Anderson, Boulder, CO (US); Eric S Mattis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1475 days.

(21) Appl. No.: 13/239,133

(22) Filed: Sep. 21, 2011

(65) Prior Publication Data
US 2012/0075992 A1    Mar. 29, 2012

Related U.S. Application Data

(60) Provisional application No. 61/386,060, filed on Sep. 24, 2010.

(51) Int. Cl.
*H04W 4/00* (2009.01)
*H04B 1/036* (2006.01)
*H04W 52/02* (2009.01)
*G06F 1/20* (2006.01)
*H04W 52/36* (2009.01)

(52) U.S. Cl.
CPC ............ *H04B 1/036* (2013.01); *G06F 1/206* (2013.01); *H04W 52/0251* (2013.01); *H04W 52/36* (2013.01); *Y02B 60/1275* (2013.01); *Y02B 60/50* (2013.01)

(58) Field of Classification Search
None
See application file for complete search history.

(56) References Cited

U.S. PATENT DOCUMENTS 6,169,884 B1    1/2001    Funk
6,510,400 B1    1/2003    Moriyama
(Continued)

FOREIGN PATENT DOCUMENTS

CN    1186575 A    7/1998
CN    1348287 A    5/2002
(Continued)

OTHER PUBLICATIONS

PCT International Search Report and Written Opinion for PCT/US2011/052832, dated Dec. 5, 2011.
(Continued)

*Primary Examiner* — Bob Phunkulh
(74) *Attorney, Agent, or Firm* — Patterson + Sheridan LLP

(57) ABSTRACT

Certain aspects of the present disclosure relate to a technique for touch temperature management of a wireless communications device based on power dissipated over time, and possibly internal temperature readings. For example, the information about power dissipated over time can be utilized along with monitored internal temperatures of a device's internal circuitry to reduce transmit power and/or data rates as required in order to keep a surface temperature of the wireless device below a specified limit. A knowledge of how the device's touch temperature varies with the dissipated power and a knowledge of the power dissipation history can be utilized to determine when to reduce the transmit power in order to avoid overheating (e.g., exceeding the touch temperature limit).

88 Claims, 6 Drawing Sheets

(56) References Cited

U.S. PATENT DOCUMENTS

| | | |
|---|---|---|
| 6,760,311 B1 | 7/2004 | Raith |
| 6,934,267 B1 | 8/2005 | Mannerstrale |
| 7,698,578 B2 | 4/2010 | Williams et al. |
| 8,135,443 B2 * | 3/2012 | Aleksic et al. ............... 455/574 |
| 8,442,529 B2 | 5/2013 | Patil et al. |
| 2005/0268133 A1 | 12/2005 | Beard |
| 2007/0132607 A1 | 6/2007 | Nagano et al. |
| 2007/0173249 A1 | 7/2007 | Ogoshi |
| 2008/0057894 A1 * | 3/2008 | Aleksic et al. ............ 455/187.1 |
| 2008/0108331 A1 | 5/2008 | Jin et al. |
| 2009/0290625 A1 | 11/2009 | Riddle et al. |

FOREIGN PATENT DOCUMENTS

| | | |
|---|---|---|
| EP | 1 193 885 A2 | 4/2002 |
| EP | 1 349 287 A1 | 10/2003 |
| JP | S63153924 A | 6/1988 |
| JP | H06144279 A | 5/1994 |
| JP | 2000284862 A | 10/2000 |
| JP | 2003511950 A | 3/2003 |
| JP | 2003347993 A | 12/2003 |
| JP | 2007096600 A | 4/2007 |
| JP | 2007166500 A | 6/2007 |
| JP | 2008131319 A | 6/2008 |
| JP | 2009071609 A | 4/2009 |
| JP | 2010016998 A | 1/2010 |
| JP | 2011109526 A | 6/2011 |
| JP | 2013518346 A | 5/2013 |
| WO | 01/20933 A1 | 3/2001 |
| WO | WO-0128105 A1 | 4/2001 |
| WO | WO-2009076619 A1 | 6/2009 |
| WO | 2009/143487 A2 | 11/2009 |
| WO | 2010048471 A1 | 4/2010 |

OTHER PUBLICATIONS

Taiwan Search Report—TW100134221—TIPO—Oct. 24, 2014.
Kunimine N., "Thermal Design Technique for Printed Circuit Board," Printed Circuit Technical Handbook, 3rd edition, Nikkan Kogyo Shimbun, Ltd., Toshitake Chino, May 30, 2006, 3rd edition, p. 260.
Taiwan Search Report—TW100134221—TIPO—May 6, 2015.

* cited by examiner

METHODS AND APPARATUS FOR TOUCH TEMPERATURE MANAGEMENT BASED ON POWER DISSIPATION HISTORY

CLAIM OF PRIORITY UNDER 35 U.S.C. §119

The present Application for Patent claims benefit of U.S. Provisional Patent Application Ser. No. 61/386,060, entitled, "Touch temperature management algorithm based on power dissipation history and internal temperature readings", filed Sep. 24, 2010 and assigned to the assignee hereof and hereby expressly incorporated by reference herein.

BACKGROUND

Field

Certain aspects of the present disclosure generally relate to wireless communications and, more particularly, to methods and apparatus for touch temperature management of a wireless communications device based on power dissipation history.

Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. The forward communication link and the reverse communication link may be established via a single-input single-output, multiple-input single-output or a multiple-input multiple-output system.

A wireless multiple-access communication system can support a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

During its communications with the base stations, wireless terminals can become hotter on their surface than what is desired. Because of that, these wireless devices can be denied for commercial use by service providers. Hence, it is desirable to control surface (touch) temperatures of wireless devices. However, existing methods for measuring touch temperatures may be often expensive and inefficient.

Methods known in the art for limiting a touch temperature of wireless communications device may throttle, for example, a transmit power and/or data rates prematurely or more often than what is being required. These methods may not even be aware of the touch temperature, and the transmit power and data rates may be throttled based on one or more internal Integrated Circuit (IC) temperatures observed within the wireless device.

SUMMARY

Certain aspects of the present disclosure provide a method for wireless communications. The method generally includes monitoring estimated one or more powers dissipated by one or more parts of an apparatus over a period of time, and adjusting at least one Quality of Service (QoS) aspect of the apparatus based on the monitored estimated one or more powers.

Certain aspects of the present disclosure provide an apparatus for wireless communications. The apparatus generally includes a first circuit configured to monitor estimated one or more powers dissipated by one or more parts of the apparatus over a period of time, and a second circuit configured to adjusting at least one Quality of Service (QoS) aspect of the apparatus based on the monitored estimated one or more powers.

Certain aspects of the present disclosure provide an apparatus for wireless communications. The apparatus generally includes means for monitoring estimated one or more powers dissipated by one or more parts of the apparatus over a period of time, and means for adjusting at least one Quality of Service (QoS) aspect of the apparatus based on the monitored estimated one or more powers.

Certain aspects of the present disclosure provide a computer program product. The computer program product generally includes a computer-readable medium comprising code for monitoring estimated one or more powers dissipated by one or more parts of an apparatus over a period of time, and adjusting at least one Quality of Service (QoS) aspect of the apparatus based on the monitored estimated one or more powers.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
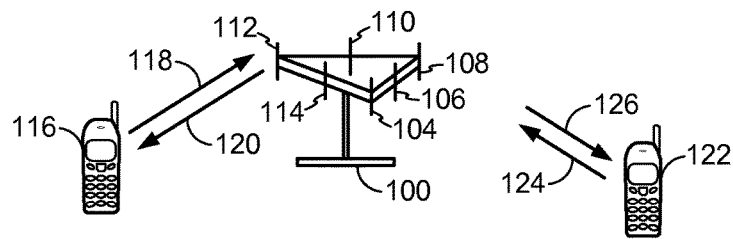
FIG. 1 illustrates an example multiple access wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that use E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). CDMA2000 is described in documents from an organization named "3rd Generation Partnership Project 2" (3GPP2). These various radio technologies and standards are known in the art.

The teachings herein may be incorporated into (e.g., implemented within or performed by) a variety of wired or wireless apparatuses (e.g., nodes). In some aspects a node comprises a wireless node. Such wireless node may provide, for example, connectivity for or to a network (e.g., a wide area network such as the Internet or a cellular network) via a wired or wireless communication link. In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In some implementations an access point may comprise a set top box kiosk, a media center, or any other suitable device that is configured to communicate via a wireless or wired medium.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), a tablet, an entertainment device (e.g., a music or video device, or a satellite radio), a television display, a flip-cam, a security video camera, a digital video recorder (DVR), a global positioning system device, or any other suitable device that is configured to communicate via a wireless or wired medium.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access point. In one aspect of the present disclosure each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
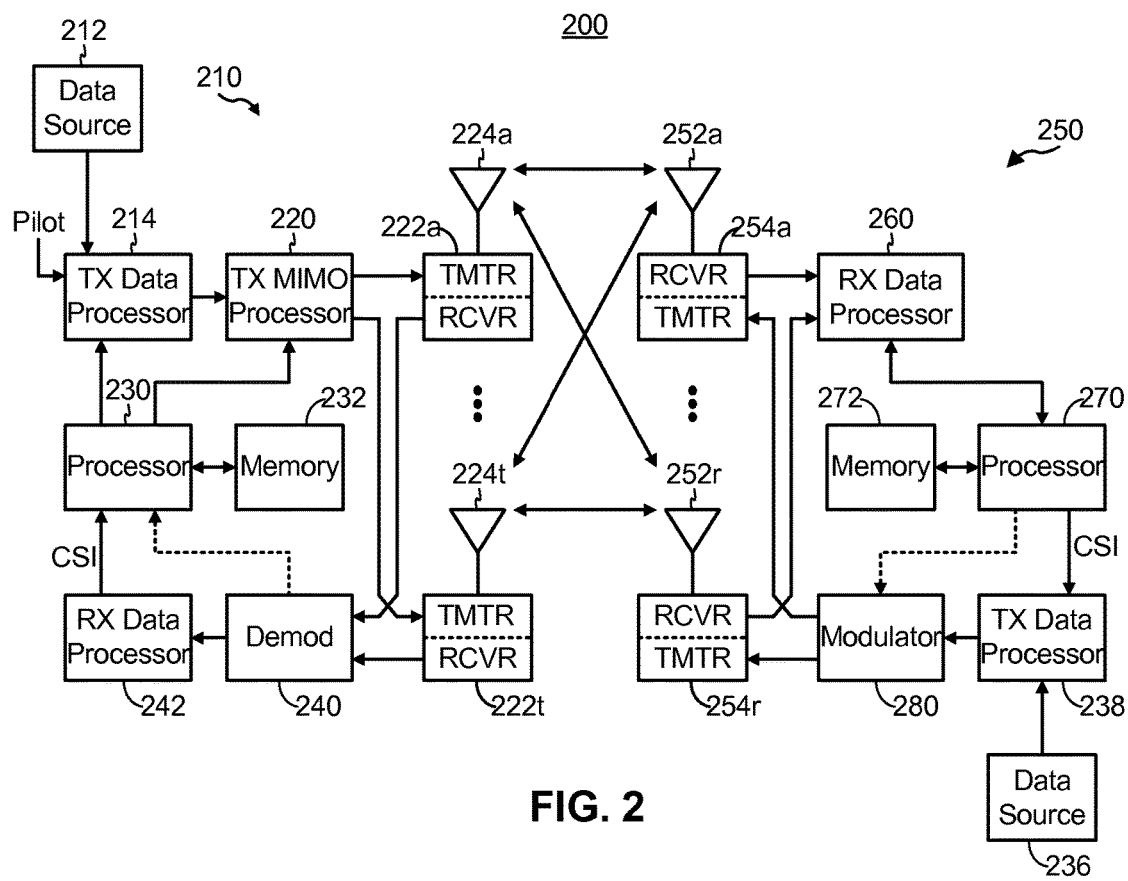
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Figure 3:
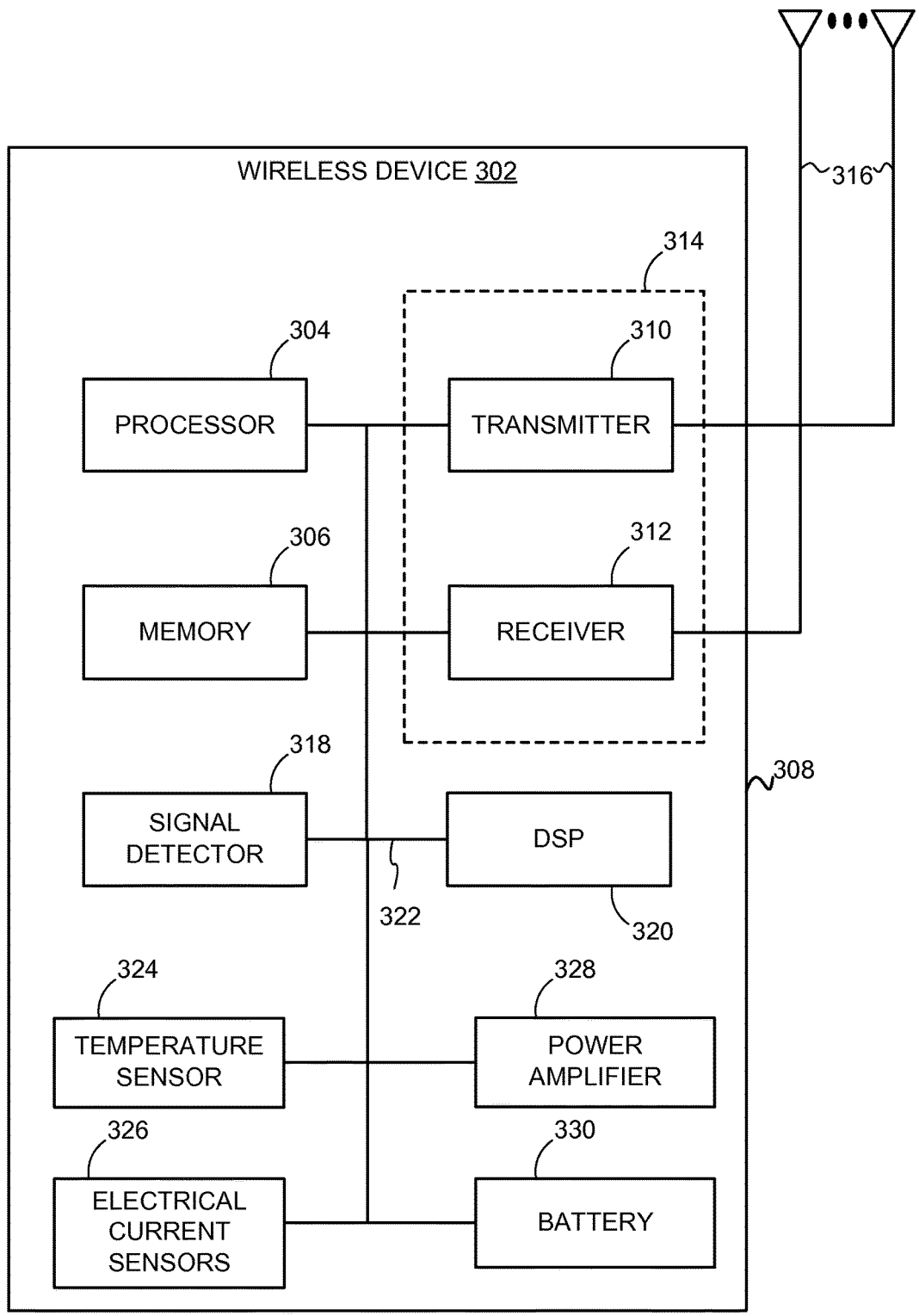
FIG. 3 illustrates a block diagram of an example wireless device in accordance with certain aspects of the present disclosure.

FIG. 3 illustrates various components that may be utilized in a wireless device 302 that may be employed within the wireless communication system from FIG. 1. The wireless device 302 is an example of a device that may be configured to implement the various methods described herein. The wireless device 302 may be an access point 100 from FIG. 1 or any of access terminals 116, 122. Further, the wireless device 302 may be an access point 210 from FIG. 2 or an access terminal 250.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Touch Temperature Management

Certain aspects the present disclosure support methods and apparatus for monitoring a total estimated power dissipated in a wireless communications device over a period of time. The information about power dissipated over time may be utilized possibly along with monitored internal temperatures of device's internal circuits to reduce transmit power and data rates as required in order to keep a surface temperature of the wireless device below a specified limit. A knowledge of how the device's touch temperature varies with the dissipated power and a knowledge of the power dissipation history may be utilized to determine more precisely when to throttle the transmit power in order to avoid overheating (e.g., exceeding the touch temperature limit). According to certain aspects of the present disclosure, the wireless communications device may comprise any of the access terminals 116, 122 from FIG. 1, the access terminal 250 from FIG. 2, or the wireless device 302 from FIG. 3.

In one aspect of the present disclosure, a temperature sensor 324 may be placed at a surface of the wireless device 302. This temperature sensor may be aware when the measured touch temperature exceeds a predefined limit, and may trigger a control mechanism for reducing the surface temperature. For example, the touch temperature limit may be defined relative to an ambient temperature of the wireless device, and, hence, there may be no absolute touch temperature limitation. The control mechanism for reducing the surface temperature may comprise at least one of: backing-off a transmit power of the wireless device, or reducing incoming/outgoing data rates associated with the wireless device.

In another aspect, one or more electrical current sensors 326 may be placed within the wireless communications device 302 for measuring one or more electrical currents (e.g., of most critical internal circuits). The measured one or more electrical currents may indicate power dissipation of the wireless device, as well as temperatures of one or more of the device's internal circuits. If any of the one or more electrical currents exceeds a threshold level, then a control mechanism may be triggered which throttles at least one of a transmit power or data rates in order to avoid exceeding a touch temperature limit of the device.

Certain aspects of the present disclosure further support attaching a sensor to a mobile wireless communications device in order to track activity of this device over a period of time. The tracked activity may provide an indication about a power dissipated over time and about a surface temperature of the device. This knowledge may be then utilized to throttle at least one of a transmit power or data rates as required for keeping the device's surface temperature below a specified limit.

In order to limit a touch temperature of the wireless communications device 302, certain aspects of the present disclosure support turning off some internal circuitry of the device (e.g., some of the circuitry 304, 306, 318, 320 of the wireless device 302). Different circuits may have different priority, and, therefore, they may be turned-off in accordance with this prioritization. For example, a circuit with the lowest priority may be turned-off first, while a circuit with the highest priority may be turned-off after all other circuits of the wireless device.

Further, in order to reduce power dissipation and avoid exceeding touch temperature limits, clock settings of different circuitry within the wireless communications device may be changed. In one aspect of the present disclosure, one or more clock frequencies of one or more internal circuits may be decreased, if one or more internal temperatures associated with the one or more internal circuits exceed one or more threshold levels. On the other hand, the one or more clock frequencies of the one or more internal circuits may be increased, if the one or more internal temperatures are below one or more other threshold levels. In another aspect of the present disclosure, decreasing one or more clock frequencies of one or more internal circuits may be applied, if the touch temperature of the wireless device becomes close to a defined limit.

In some cases, the wireless device may be too cold, e.g., the touch temperature may be below a certain threshold level (e.g., below 0° C.) and/or at least one internal temperature associated with at least one internal circuit of the wireless device may be below a specified temperature level. Then, the wireless device may need to be heated up to ensure meeting timing specifications of the one or more internal circuits. In an aspect, one or more clock frequencies (and/or voltages) of the one or more internal circuits may be increased to allow maximum performance of the wireless device, if this is requested or required by an associated modem or by a running application.

Certain aspects of the present disclosure support associating multiple sensors with a wireless communications device, wherein the sensors may be internal or external. Each of these sensors may be related to a different action for limiting a touch temperature of the wireless device. These actions may be performed in a specific order according to its predefined prioritization. In an aspect, the priority of actions may depend on a current operating mode of the wireless device.

Thermal Based Flow Control

The present disclosure describes in detail methods and apparatus for controlling data rates of a wireless communications device in order to mitigate the aforementioned overheat problem of the device. In one aspect of the present disclosure, the data rates being controlled may be related to data rates of 1×EV-DO (1 times Evolution-Data Optimized) wireless communications standard. In another aspect, the data rates being controlled may be related to data rates of 1×RTT (1 times Radio Transmission Technology) wireless communications standard. In yet another aspect, the data rates being controlled may be related to data rates of Evolved High-Speed Packet Access (HSPA+) wireless communications standard. In yet another aspect, the data rates being controlled may be related to data rates of Long Term Evolution (LTE) wireless communications standard.

Motivation for thermal based flow control within the wireless communications device is first described, as well as how this flow control may be integrated within a Congestion Control Manager (CCM) frame work of the wireless device. The CCM may comprise: a CCM command router, CCM command arbitration functional blocks, CCM action arbitration functional blocks, a reverse link (uplink) flow control algorithm, a forward link (downlink) flow control algorithm, and corresponding interfaces between component blocks.

In chipsets that support very high data rate technologies such as Long Term Evolution (LTE) or Dual Cell High Speed Packet Access (DC-HSPA), an access terminal (AT) (e.g., the wireless device 302 from FIG. 3) may not be able to dissipate the generated heat. This problem may be due to running a power amplifier (PA) (e.g., a PA 328 of the wireless device 302) at high power output for achieving high data rates. Additionally or alternatively, the problem may be due to running internal processors of the AT at high clock rates in order to process high data rates.

The required processing power for enabling advanced receiver modem techniques (e.g., interference cancellation and equalization) and the required power for processing arriving/outgoing packets may demand larger processors running at higher frequencies. As a result, the AT may be overheated. For example, the PA may exceed the maximum junction temperature after about 5 minutes of transmitting at the transmit power of 23 dBm. In this exemplary case, a touch temperature of the AT may be predicted to lie between 42° C. and 51° C. with the temperature limit for a plastic housing set at 75° C.

When considering an architecture where simultaneous voice and high data rate concurrencies are desired, a thermal safety mechanism may be required. In order to mitigate the surface overheating, a flow control mechanism can be designed at the AT to be triggered by temperature sensors. Since the heat dissipation may be a slow process (e.g., time constants may be in the order of minutes) and there may be, for example, a handoff from LTE to eHRPD (evolved High Rate Packet Data) or data service transfer from LTE to HRPD/1×RTT, this control mechanism may be required to control heat generation source even after the handoff.

The present disclosure describes how 1×EV-DO and 1×RTT wireless devices can reduce their respective data rates so that the heat generated from the PA or Central Processor Unit (CPU) may be reduced to an acceptable level. In the same time, the highest possible data rate in the system may be maintained.

In one aspect of the present disclosure, a thermal sensor for a PA subsystem of a wireless device (e.g., the temperature sensor 324 associated with the PA 328 of the wireless device 302 illustrated in FIG. 3) may be integrated with a CCM to impact only a reverse link flow control. Further, a thermal sensor for monitoring a temperature of baseband circuitry (e.g., a baseband (BB) subsystem comprising the processor 304, the signal detector 318 and the DSP 320 of the wireless device 302) may be integrated with the CCM to impact both reverse and forward link flow control.

Figure 4:
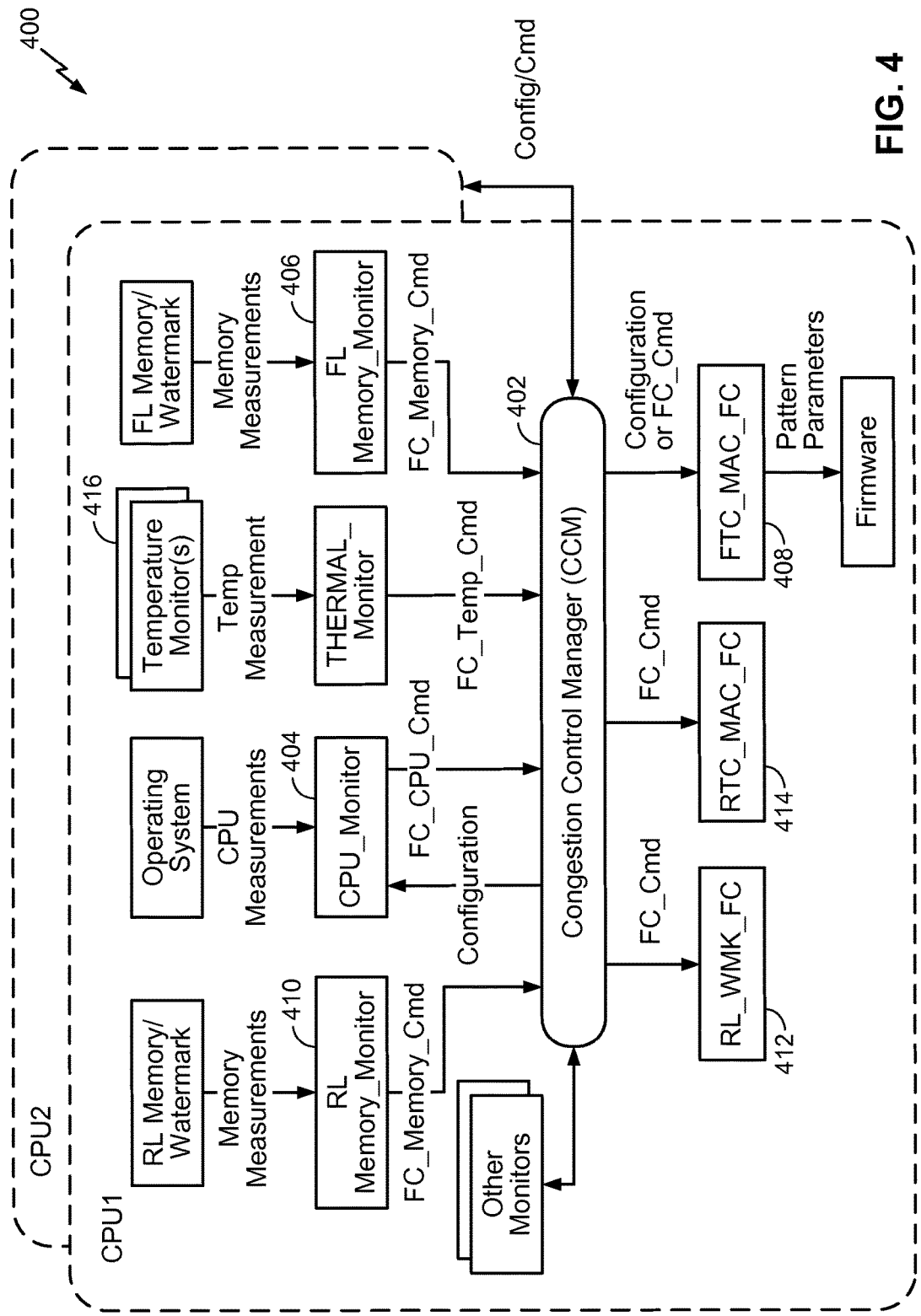
FIG. 4 illustrates an example flow control block diagram of a wireless communications device with temperature monitors in accordance with certain aspects of the present disclosure.

FIG. 4 illustrates an example flow control circuitry 400 within a CPU of wireless communications device in accordance with certain aspects of the present disclosure. The CPU may comprise functional blocks that may be used for Forward Link (FL) flow control, such as: FL functions of a CCM unit 402, a CPU Monitor 404, a FL Memory Monitor 406, and a Forward Traffic Channel Media Access Control Flow Control (FTC-MAC-FC) unit 408. The functional blocks for reverse link (RL) flow control may comprise: a RL Memory Monitor 410, a Reverse Link Watermark Flow Control (RL-WMK-FC) unit 412, a Reverse Traffic Channel Media Access Control Flow Control (RTC-MAC-FC) unit 414, and corresponding RL functions of the CCM unit 402.

Certain aspects of the present disclosure support two different classes of temperature monitors 416 illustrated in FIG. 4: THERMAL-MONITOR-PA and THERMAL-MONITOR-BB. The THERMAL-MONITOR-PA may monitor a temperature (e.g., an average temperature) of power amplifier (PA) subsystem. On the other hand, the THERMAL-MONITOR-BB may be utilized to monitor a temperature of a baseband (BB) circuitry.

In order to integrate these two classes of temperature monitors into the CCM framework, a command routing function may be expended to facilitate routing the THERMAL_MONITOR_BB to both FL and RL command arbitration (CMD_ARB) functional blocks. In this way, a flow control triggered by the BB circuitry overheat may start forward and reverse link flow control. An additional CMD_ARB functional block may be utilized for arbitration between the THERMAL_MONITOR_BB and the THERMAL_MONITOR_PA. Aside from expansion of command arbitration function, at least two action determination (ACT_DET) functional blocks may be added in the flow control architecture 400 for managing arbitration between CPU-based and thermal-based reverse flow control.

Inputs to the flow control algorithm may require temperature readings. Several temperature readings may be typically available in the chipsets, and they may be obtained externally or internally.

In one aspect of the present disclosure, an external thermistor may be monitored through a housekeeping analog-to-digital convertor (HK-ADC). This may be software driving polling process. The thermistor may be placed close to the actual chip of wireless device whose surface temperature is being monitored in order to achieve the best possible thermal coupling. In the preferred aspect, the thermistor may be located on a device's Printed Circuit Board (PCB) on the exactly opposite side from the chip.

In another aspect of the present disclosure, temperature sensors may be placed internally. These sensors may be typically implemented as PTAT (proportional to absolute temperature PN junction) or CTAT (complementary to absolute temperature PN junction) sensors. The internal sensors may be programmed to issue an interrupt when a predefined threshold is crossed. Alternatively, these sensors may be polled.

A radio frequency (RF) subsystem of a wireless device may typically require a thermistor in close proximity to a PA. In an aspect, the temperature reading of this thermistor may be processed through software algorithms. The closer in proximity this thermistor is to the PA, better the thermal coupling with the PA may be. It should be noted that this sensor may be the most important for temperature monitoring, since the PA may tend to thermally saturate any device when hitting a maximum transmit power for several minutes.

In one aspect of the present disclosure, each Power Management Integrated Circuit (PMIC) of a wireless device may comprise an internal temperature sensor. A software algorithm may have an access to temperature readings associated with this temperature sensor through a Single-wire Serial Bus Interface (SSBI). This temperature sensor may be capable of generating an interrupt when a predefined threshold is violated.

Other temperature sensors may be also associated with the wireless device. For example, a crystal oscillator (XO) thermistor may be placed externally. This thermistor may measure a surface temperature of the wireless device, for example, approximately every 1 sec, which may be controlled by a Temperature Compensated Crystal Oscillator (TCXO) manager when a Global Positioning System (GPS) receiver associated with the wireless device is off. On the other hand, the XO thermistor may measure the device's surface temperature, for example, every 100 ms when the GPS receiver is on. A Resistance Thermometer (RTR) sensor may be, for example, placed internally and used by the RF circuitry of wireless device. Furthermore, a BATT (battery) thermistor may be located externally on a battery of the wireless device, and it may be controlled by software (e.g., a charging code). In addition, a charger thermistor may be placed externally and may be also controlled by the charging code.

Figure 5:
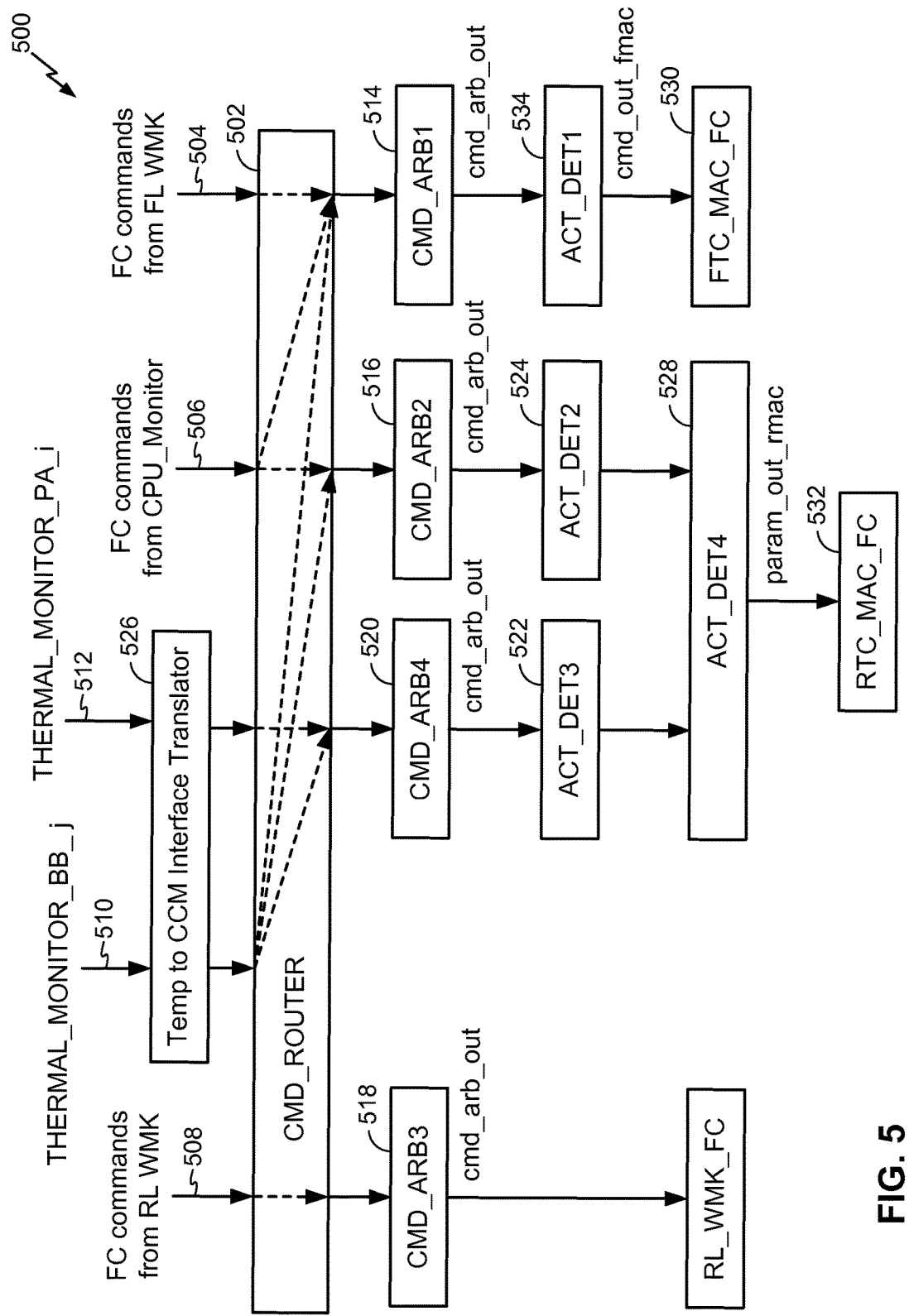
FIG. 5 illustrates an example block diagram of a congestion control manager (CCM) of a wireless communications device with temperature monitors in accordance with certain aspects of the present disclosure.

Design Details of Thermal Based Flow Control for Wireless Devices Operating in Accordance with 1×EV-DO FIG. 5 illustrates an example block diagram of a CCM 500 with temperature monitors as a part of a wireless device operating in accordance with 1×EV-DO wireless communications standard. The CCM 500 may comprise three different types of functional sub-blocks: a command router (e.g., CMD_ROUTER 502), command arbitration (CMD_ARB) functional blocks, and action determination (ACT_DET) functional blocks.

The CMD_ROUTER 502 may route received flow control commands to appropriate command arbitration function(s). For example, one of flow control commands 504 generated by a forward link (FL) Memory Monitor may trigger a FL flow control only, one of commands 506 generated by a CPU Monitor may trigger FL and/or reverse link (RL) flow control, and one of commands 508 generated by a RL Memory Monitor may trigger the RL flow control only. Further, a THERMAL_MONITOR_BB command signal 510 may trigger both FL and RL flow controls, and a THERMAL_MONITOR_PA command signal 512 may trigger the RL flow control only.

Therefore, as illustrated in FIG. 5, the commands 504 generated by FL WMK may be routed to a CMD_ARB1 functional block 514, the commands 506 from the CPU Monitor may be routed to both CMD_ARB1 block 514 and CMD_ARB2 block 516, and the commands 508 from RL WMK may be routed to a CMD_ARB3 functional block 518. Further, the commands 510 originated from the THERMAL_MONITOR_BB may be routed to CMD ARB1 block 514, CMD_ARB2 block 516, and CMD_ARB4 block 520, while the commands 512 originated from the THERMAL_MONITOR_PA may be routed to the CMD ARB4 functional block 520.

Command arbitration (CMD_ARB) functional block may be utilized to consolidate conflicts among the received commands and generate an arbitrated command for a following block. An action determination (ACT_DET) functional block may be used to determine parameters sent to the flow controller. Optionally, the ACT_DET entity may also determine the interaction among the FL and RL flow control for managing CPU utilization. For example, the ACT_DET4 functional block 520 may be designed to arbitrate between ACT_DET3 functional block 522 and ACT_DET2 functional block 524.

A temperature-to-CCM interface translator 526 represents an interface between temperature monitors and the CMD router 502. Since each temperature monitor may utilize a different command than that used by the CMD ARB functional blocks, the interface translator 526 may specify mapping between the temperature sensor event and a CCM command.

Temperature Monitors in Thermal Based Flow Control

Figure 6:
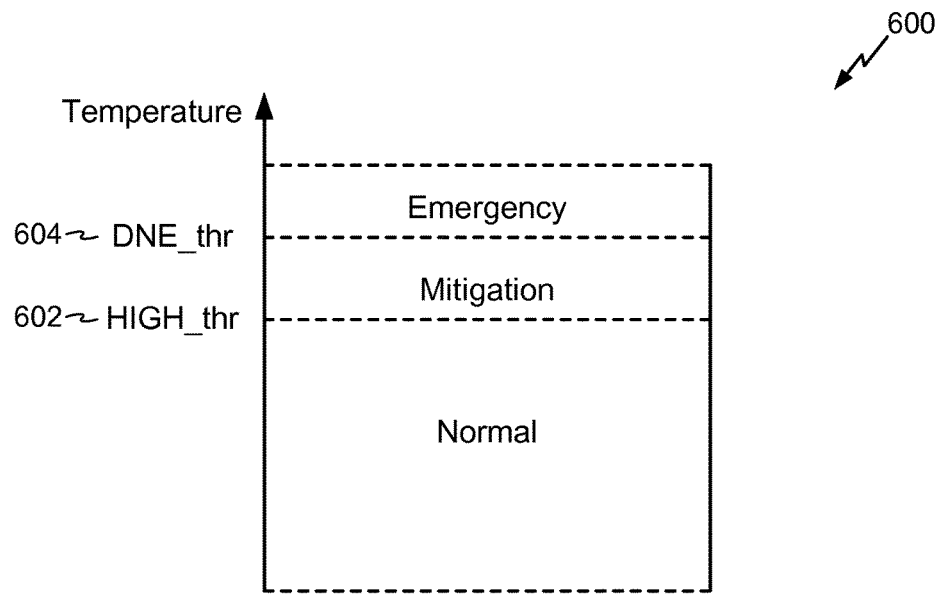
FIG. 6 illustrates an example threshold and state diagram of a temperature monitor associated with a wireless communications device in accordance with certain aspects of the present disclosure.

FIG. 6 illustrates an example threshold and state diagram 600 of a temperature monitor associated with the thermal based flow control illustrated in FIG. 5 in accordance with certain aspects of the present disclosure. The temperature monitor may generate three commands based on two configured thresholds. If the monitored temperature is below a threshold 602, the temperature monitor may generate a "normal" command. In this case, the rate control may be stopped, and/or data rate may be recovered to a value before being backed-off. If the monitored temperature is above the threshold 602 but still below an upper (critical) threshold 604, the temperature monitor may generate a "mitigation" command that triggers the thermal based flow control illustrated in FIG. 5. If the monitored temperature is above the critical threshold 604, the temperature monitor may generate an "emergency" command. Then, an internal circuit of a wireless device associated with the monitored temperature may be shut down.

Figure 7:
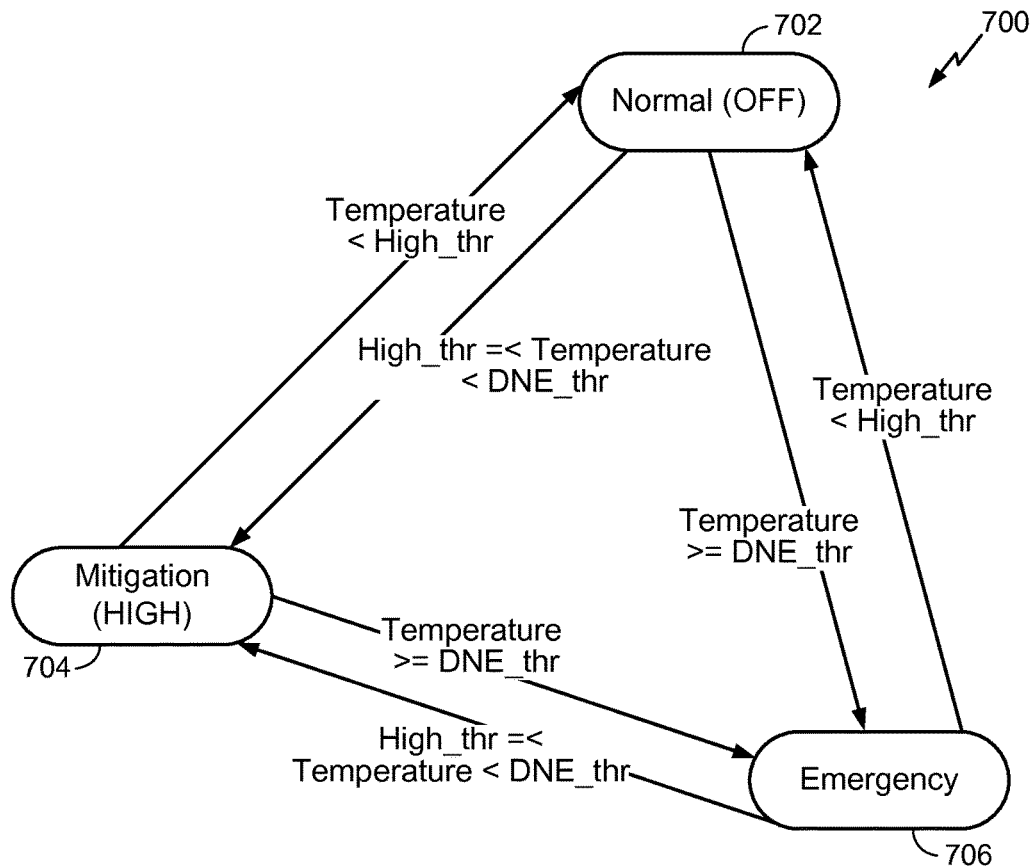
FIG. 7 illustrates an example state machine of a temperature monitor associated with a wireless communications device in accordance with certain aspects of the present disclosure.

FIG. 7 illustrates an example state machine 700 of a temperature monitor associated with the threshold/state diagram 600 from FIG. 6 in accordance with certain aspects of the present disclosure. The temperature monitor may be in a normal (off) state 702 if the monitored temperature is below the threshold level 602 illustrated in FIG. 6. The temperature monitor may switch from the normal state 702 to a mitigation (high) state 704, if the measured temperature is between the threshold levels 602 and 604. Also, the temperature monitor may switch from the normal state 702 to an emergency state 706, if the measured temperature becomes larger than the threshold level 604. Once in the mitigation state 704, the temperature monitor may switch back to the normal state 702, if the measured temperature becomes smaller than the threshold level 602. The temperature monitor may switch from the mitigation state 704 to the emergency state 706, if the measured temperature is above the threshold level 604. Once in the emergency state 706, the temperature monitor may switch back to the mitigation state 704, if the measured temperature is larger than the threshold level 602 and below the threshold level 604. The temperature monitor may go directly from the emergency state 706 to the normal state 702, if the measured temperature becomes smaller than the threshold level 602.

When the temperature monitor is in the normal state 702, it may generate the "normal" command that may be mapped to, for example, a CCM compliant enumeration "00000". The "mitigation" (warning) command may be issued when the temperature monitor is in the mitigation state 704, and this command may be mapped to, for example, a CCM compliant enumeration "00111". The "emergency" (critical) command may be generated when the temperature monitor is in the emergency state 706, and this command may be mapped to, for example, a CCM compliant enumeration "11111".

In an aspect of the present disclosure, the "mitigation" command may be generated once the temperature monitor is in the mitigation state 704 triggering the thermal based flow control, but no temperature improvement may be observed. A timer associated with the temperature monitor may be set to a predefined value. After the timer expires and there is no substantial temperature improvement while being in the mitigation state 704 for a defined period of time, it may be possible to throttle transmit power and/or data rates further (e.g., deeper level of throttling/power savings may be activated) in order to save more power and to reduce the measured temperature below the mitigation threshold level 602.

Certain aspects of the present disclosure also support the capability of wireless device to shut off advanced receiver features that may cost power, when the temperature monitor is in the mitigation state 704 and the "mitigation" command is generated that triggers the thermal based flow control. For example, in an aspect of the present disclosure, the triggered thermal based flow control may comprise at least one of disabling receive diversity or disabling interference cancellation at the wireless device.

Several factors may be traded off when setting configuration of aforementioned temperature thresholds and customer experience. Every form factor may require a calibration for understanding transient and steady state behavior of the wireless device and resident temperature sensors. For example, understanding relation between the temperature near a PA and the device surface temperature may enable to properly set thresholds for changing thermal states.

A temperature visibility may be an important factor. Only a finite number of temperature sensors may be present, typically a PA sensor and a Power Management Integrated Circuit (PMIC) sensor. With only a couple of points of visibility, the device may not be sampled in its hottest location, internal or external. Therefore, the exact cause of the heating problem may not be known—for example, whether it is only PA related, Mobility Management (MM) related or Apps processor related.

The aforementioned temperature thresholds may be set against different sub-systems (e.g., PA, Mobile Data Modem (MDM), and PMIC sub-systems) such that to prioritize what is being attacked first in thermal situations. For example, in a high temperature situation, it is likely that the PA sub-system may be involved. Therefore, setting the PA temperature having a lower threshold than the MDM sub-system temperature may result in triggering data throttling on an uplink that lowers data throughputs and PA power (transmit power). If the PA is not the chief culprit, then the MDM temperature may continue to rise. If the threshold of the MDM sensor is crossed, then focus may be on other areas of MDM power consumption such as MM power and Apps processing.

With the possibility to only have PA temperature sensors, PMIC temperature sensors and an XO temperature sensor, it may be required to set temperature thresholds associated with these sensors at similar points in thermal transient. In this way, no prioritization may initially exist, but the power consumption may be attacked on all possible fronts when one of the temperature sensors is in the mitigation state.

In an aspect, the temperature thresholds may be set too conservatively (e.g., low). If the thermal calibration is not properly done and it is required to hedge lower to be on the safe side, then the wireless device may spend too much time in a Quality of Service (QoS) disadvantaged state, which may not be necessary. Lower throughputs, worse modem performance and some MM features being unavailable would represent unnecessary inconveniences in this case, which may also cause customer dissatisfaction.

In another aspect, the temperature thresholds may be set too aggressively (e.g., high). Hedging the temperatures hotter may cause the wireless device to risk damaging components, and/or it may cause user discomfort/dissatisfaction with the health/safety aspects of the wireless device.

This may threaten carrier liability and may be a gating factor in any commercial device launch until proper thresholds are established.

Congestion Control Manager (CCM) Functions

The aforementioned CCM command arbitration function (CMD_ARB) may receive flow control commands from a command router, arbitrate among all stored commands, and resolve possible conflicts. In one aspect of the present disclosure, the rule of arbitration may be as follows. A "Shut Down" command may be taken, if this command is among the received commands. Otherwise, a "Set_Min" command may be taken, if this command is among the received commands. Otherwise, a "Down" command may be taken, if this command is among the received commands. Otherwise, a "Freeze" command may be taken, if this command is among the received commands. Otherwise, an "Up" command may be taken, if this command is among the received commands. Otherwise, an "Off" command may be taken.

To facilitate the arbitration rule, the flow control commands may be appropriately enumerated. For example, the "Shut Down" command may be enumerated as "11111". Further, the "Set_Min" command may be, for example, enumerated as "01111", the "Down" command may be, for example, enumerated as "00111", the "Freeze" command may be, for example, enumerated as "00110", the "Up" command may be, for example, enumerated as "00100", and the "Off" command may be, for example, enumerated as "00000".

Each CMD_ARB functional block may create a state variable vector for storing an incoming flow control command received from the command router. Dimension of the state variable vector may be equal to a number of monitors from which the command router forwards the flow control commands to this CMD_ARB functional block. All command vector elements may be set to 0b00000 at initialization.

When the CMD_ARB functional block receives a flow control command from the command router, it may refresh the corresponding vector element with the received command and perform arbitration using the bitwise OR (e.g., union) operation as follows:

$$\text{cmd\_arb\_out} = \bigcup_i \text{cmd\_vector}[i]. \quad (1)$$

It should be noted that this arbitration scheme may be extended to any number of monitors.

After performing the aforementioned arbitration, the CMD_ARB functional block may check the resulting flow control command against the last command arbitration result. If they are different, then a new command may be sent to the next functional block, e.g., to an action determination (ACT_DET) functional block. Otherwise, no command may be sent. This may prevent the same command being sent back-to-back towards the ACT_DET functional block.

The CCM action determination functional block, ACT_DET, may receive the new flow control command from the CMD_ARB functional block, and may determine the command sent to either a FTC_MAC_FC entity (e.g., a FTC_MAC_FC unit 530 from FIG. 5) or to a RTC_MAC_FC entity (e.g., a RTC_MAC_FC unit 532).

An ACT_DET1 functional block 534 may be responsible for forwarding the flow control command to the FTC_MAC_FC unit 530. The only impact to the ACT_DET1 may be how to handle the "Shut Down" command. The ACT_DET2 functional block 524 may be responsible for activating and deactivating the RTC_MAC_FC unit 532 for CPU-based flow control. An interface between the ACT_DET2 unit 524 and RTC_MAC_FC unit 532 may specify whether the reverse link flow control is triggered or not. Then, the RTC_MAC_FC unit 532 may stop transmitting MAC packets over all carriers except over a sleep (SLP) carrier.

The ACT_DET3 functional block 522 may be responsible for calculating reverse flow control as a result of thermal mitigation or shut down trigger. The ACT_DET4 functional block 528 may be responsible for arbitrating between the ACT_DET2 functional block and the ACT_DET3 functional block. Optionally, there may be an interface between ACT_DETi and ACT_DETj functional blocks in order to coordinate taken actions.

In order to accommodate an action required to mitigate overheat, the following algorithm may be proposed that relies on the output of CMD_ARB4 block 520 illustrated in FIG. 5. The payload size may be, for example, initialized to 12, which may refer to a highest possible bandwidth. A time period between two consecutive "Down" command actions generated by a temperature monitor (e.g., 'temp_step_down' parameter) may be initialized to 1000 ms (a default value may be 250 ms). A 'step_up_multiplier' parameter that specifies multiples of 'temp_step_down' for calculating a delay between two consecutive "Off" commands generated by a temperature monitor may be initialized to four (default value). It should be noted that: temp_step_up=temp_step_down·step_up_multiplier.

A parameter 'minPayloadSize' specifying the least payload size during thermal mitigation may be initialized to two (default value). A reverse link flag ('RL_flag') may be set to an "off" state. A parameter 'DelayTime' specifying an estimated signaling delay from a CPU Monitor to a CCM may be initialized to the default value of 2 ms. In an aspect, this parameter may account for the CCM timer.

The proposed algorithm may perform following functions that correspond to the flow control commands received from the CMD_ARB4 functional block or to expiration of a temperature monitor timer (e.g., 'temp_timer'). After registration for THERMAL_MONITOR_PA or THERMAL_MONITOR_BB, an initial state of the temperature monitor may be obtained.

If CMD_ARB4=DOWN and RL_flag=OFF, then

PayLoadSize=minPayloadSize,RL_flag=ON,Start temp_timer=temp_step_down+DelayTime.

Else if CMD_ARB4=DOWN and RL_flag=ON, then

PayLoadSize=max{minPayloadSize,PayLoadSize−1},

Start temp_timer=temp_step_down+DelayTime.

Else if CMD_ARB4=OFF and RL_flag=ON, then

PayLoadSize=min{[PayLoadSize+1],12},

Start temp_timer=temp_step_up+DelayTime.

If PayLoadSize=12,then RL_flag=OFF, and stop temp_timer.

Else if CMD_ARB4=SHUT_DOWN, then stop temp_timer and PayLoadSize=0, which may refer to the minimum payload size.

In order to combine the action from reverse link CPU flow control and temperature based flow control, the output of ACT_DET2 functional block and ACT_DET3 functional block may be combined in the ACT_DET4 functional block.

If an attribute 'DisableAllCarriersButSLP' from the ACT_DET2 functional block is set to '1', then the CPU-based RL flow control may be triggered and the RTC_MAC_FC may set the maximum payload size of all active carriers to zero except of the SLP carrier. The SLP carrier may be kept at a default maximum payload size. On the other hand, if this attribute is set to '0', then the CPU-based RL flow control may be disabled and the RTC_MAC_FC may use the default maximum payload size for all active carriers.

An attribute 'PayloadSize' from the ACT_DET3 functional block may vary between 0 and 12. If 'DisableAllCarriersButSLP'='0', this value may apply to all active carriers. If 'DisableAllCarriersButSLP'='1', this value may apply to the SLP carrier. The value '0' may refer to the minimum payload size for the SLP carrier. The numbers from 1 to 12 may correspond to a payload index.

When the CMD_ARB1 output command is "Shut Down", then the FTC_MAC_FC unit may use a defined initial pattern and set a Flow Control (FC) flag to be in "on" state regardless of the previous state of the FC flag or Digital Rate Control (DRC) pattern. Then, the CMD_ARB1 functional block may act on all other commands per requirements. It should be noted that the CMD_ARB1 block may need to be changed in order to allow for the new 5-bit command enumeration.

For thermal based flow control, THERMAL_MONITOR_BB commands may be routed to the CMD_ARB2 functional block and arbitrated per aforementioned description. If the result of arbitration is "Shut Down" command, this command may act in the same way as "Down" command for the ACT_DET2 block. Using the thermal based command in the CDM_ARB2 block may be useful as it may trigger transmission shut down of all but the signaling link protocol (SLP) carrier.

An interface may exist between the CCM unit and RTC MAC FC unit. If the attribute 'DisableAllCarriersButSLP' is set to '1', then the CPU-based RL flow control may be triggered and RTC_MAC_FC unit may set the maximum payload size of all active carriers to zero except for the SLP carrier. The SLP carrier may be kept at the default maximum payload size. If this attribute is set to '0', it means that the CPU-based RL flow control may be disabled and the RTC_MAC_FC may use the default maximum payload size for all active carriers.

The attribute 'PayloadSize' may vary between 0 and 12, for example. If 'DisableAllCarriersButSLP'='0', this value may apply to all active carriers. If 'DisableAllCarriersButSLP'='1', this value may apply to the SLP carrier. The value '0' may refer to the minimum payload size for the SLP carrier. The numbers from 1 to 12 may correspond to the Payload Index.

Thermal Based Flow Control for Wireless Devices Operating in Accordance with 1×RTT Certain aspects of the present disclosure support thermal based forward and reverse link flow control in a wireless communications device operating in accordance with the 1×RTT wireless communications standard. In one aspect of the present disclosure, the wireless device (e.g., an access terminal) may perform stopping requests for Reverse Shared Channel (R-SCH), if thermal monitor command arbitration generates "Down" or "Shut Down" commands, e.g., if at least one of the internal temperatures exceeds a threshold level.

While being in "thermal mitigation" state (e.g., in "down" state) or in "shut down" state, the access terminal may discard an extended supplemental channel assignment message (ESCAM), and may not request for R-SCH. In this case, the access terminal may transmit a Supplemental Channel Request Message (SCRM). When the access terminal returns from the "thermal mitigation" or "shut down" state into a "normal" ("off") state, then the access terminal may resume processing of the R-SCH.

Figure 8:
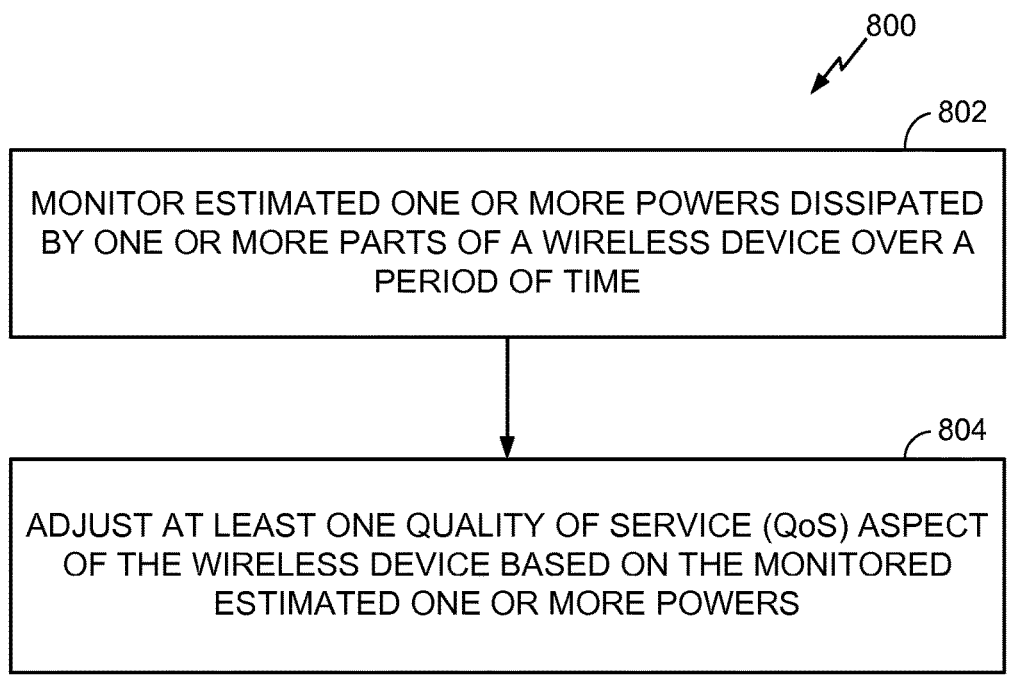
FIG. 8 is a functional block diagram conceptually illustrating example blocks that may be performed at a wireless communications device for managing a touch temperature of the wireless communications device in accordance with certain aspects of the present disclosure.

FIG. 8 is a functional block diagram conceptually illustrating example blocks 800 executed at a wireless device (e.g., at a wireless receiver or an access terminal) for managing a touch temperature of the wireless device in accordance with certain aspects of the present disclosure. Operations illustrated by the blocks 800 may be executed, for example, at the processor 270 of the access terminal 250 from FIG. 2 or at the processor 304 of the wireless device 302 from FIG. 3.

The operations may begin, at block 802, by monitoring estimated one or more powers dissipated by one or more parts of the access terminal over a period of time. At block 804, the access terminal may adjust at least one Quality of Service (QoS) aspect of the access terminal based on the monitored estimated one or more powers. In some aspects, one or more temperatures of the one or more parts may also be monitored, and the access terminal may adjust the at least one QoS aspect of the access terminal based on the one or more monitored temperatures. The adjustment may be performed based on a known function between the estimated one or more powers, a duration of time, and a surface temperature of the access terminal. In one aspect, the access terminal may operate in accordance with 1×EV-DO wireless communications standard. In another aspect, the access terminal may operate in accordance with 1×RTT wireless communications standard. In yet another aspect, the access terminal may operate in accordance with LTE wireless communications standard. In yet another aspect, the access terminal may operate in accordance with Evolved High-Speed Packet Access (HSPA+) wireless communications standard.

In an aspect of the present disclosure, execution of one or more functions may be transferred from the one or more parts to one or more other parts of the access terminal, if the one or more temperatures exceed one or more thresholds. In another aspect of the present disclosure, adjusting the at least one QoS aspect of the access terminal may comprise reducing a charge current of a battery of the access terminal (e.g., of a battery 330 of the wireless device 302 from FIG. 3) or disabling charging of the battery, if a temperature of the one or more temperatures associated with the battery exceeds a threshold. In yet another aspect, adjusting the at least one QoS aspect may comprise adjusting a data rate associated with a forward and reverse communication link of the apparatus, if the temperature of baseband circuitry exceeds a threshold level, and adjusting a data rate associated with the reverse communication link of the apparatus, if the temperature of power amplifier exceeds another threshold level.

In one aspect of the present disclosure, at least one of one or more clock frequencies of one or more internal circuits of the apparatus or one or more voltages of the one or more internal circuits may be decreased, if the one or more internal temperatures associated with the one or more internal circuits exceed one or more threshold levels. On the other hand, the one or more clock frequencies of the one or more internal circuits may be increased, if the one or more internal temperatures are below one or more other threshold levels.

In one configuration, the apparatus 250 for wireless communication includes means for monitoring estimated one or more powers dissipated by one or more parts of the apparatus 250 over a period of time, and means for adjusting at least one QoS aspect of the apparatus 250 based on the monitored estimated one or more powers. In some aspects, the apparatus 250 may also comprise a means for monitoring one or more temperatures of the one or more parts and a means for adjusting the at least one QoS aspect of the apparatus 250 based on the one or more monitored temperatures. In one aspect, the aforementioned means may be the processor 270 configured to perform the functions recited by the aforementioned means. In another aspect, the aforementioned means may be a module or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

The invention claimed is:

1. A method for wireless communications, comprising:
    monitoring estimated one or more powers dissipated by one or more parts of an apparatus over a period of time;
    monitoring one or more temperatures of the one or more parts; and
    adjusting at least one Quality of Service (QoS) aspect of the apparatus based on the monitored estimated one or more powers and monitored one or more temperatures of the one or more parts, wherein the adjusting is performed based on a known function between the estimated one or more powers, a duration of time, and a surface temperature of the apparatus.

2. The method of claim 1, wherein adjusting the at least one QoS aspect comprises:
    reducing at least one of a transmit power or a data rate of the apparatus.

3. The method of claim 2, wherein:
    the data rate comprises a data rate of at least one of a 1×EV-DO (1 times Evolution-Data Optimized), 1×RTT (1 times Radio Transmission Technology), Long Term Evolution (LTE), or Evolved High-Speed Packet Access (HSPA+) wireless communications standard.

4. The method of claim 2, further comprising:
    recovering the data rate to a value before the adjustment, if at least one temperature of at least one of the one or more parts of the apparatus is below a first threshold.

5. The method of claim 2, wherein reducing the at least one of transmit power or data rate of the apparatus comprises:
    adjusting the data rate, if at least one temperature of at least one of the one or more parts of the apparatus is above a first threshold and below a second threshold; and
    turning off at least one internal circuit associated with the at least one temperature, if the at least one temperature is above the second threshold.

6. The method of claim 5, further comprising:
    disabling one or more advanced receiver techniques at the apparatus, if the at least one temperature is above the first threshold and below the second threshold.

7. The method of claim 6, further comprising:
    activating a further reduction of the at least one of transmit power or data rate, if the at least one temperature is above the first threshold and below the second threshold for a defined period of time.

8. The method of claim 6, wherein the one or more advanced receiver techniques comprises at least one of receive diversity, interference cancellation, or a mitigation technique applied on a Central Processing Unit (CPU) of the apparatus.

9. The method of claim 1, further comprising:
    monitoring the surface temperature of the apparatus; and
    triggering a control mechanism to reduce the surface temperature, if the surface temperature exceeds a threshold level.

10. The method of claim 9, wherein the threshold level is based on an ambient temperature associated with the apparatus.

11. The method of claim 1, further comprising:
    measuring one or more electrical currents associated with one or more internal circuits of the apparatus, wherein the one or more temperatures of the one or more parts are based on the one or more electrical currents, and
    adjusting the at least one QoS aspect of the apparatus based on the monitored estimated one or more powers and the monitored one or more temperatures of the one or more parts comprises triggering a control mechanism to reduce at least one of a transmit power or a data rate of the apparatus, if any of the one or more electrical currents exceeds a threshold level.

12. The method of claim 11, wherein the control mechanism comprises:
    limiting the at least one QoS aspect by lowering power dissipation of the one or more internal circuits.

13. The method of claim 1, further comprising:
    decreasing at least one of one or more clock frequencies of one or more internal circuits of the apparatus or one or more voltages of the one or more internal circuits, if one or more internal temperatures associated with the one or more internal circuits exceed one or more threshold levels.

14. The method of claim 13, further comprising:
increasing the one or more clock frequencies of the one or more internal circuits, if the one or more internal temperatures are below one or more other threshold levels.

15. The method of claim 1, wherein monitoring the estimated one or more powers and the monitored one or more temperatures of the one or more parts comprises:
monitoring a temperature of a power amplifier associated with the apparatus; and
monitoring a temperature of a baseband circuitry of the apparatus, and
wherein the estimated one or more powers dissipated by the one or more parts of the apparatus over the period of time are based on the temperature of power amplifier and the temperature of baseband circuitry.

16. The method of claim 15, wherein adjusting the at least one QoS aspect comprises:
adjusting a data rate associated with a forward and reverse communication link of the apparatus, if the temperature of the baseband circuitry exceeds a threshold level.

17. The method of claim 15, wherein adjusting the at least one QoS aspect comprises:
adjusting a data rate associated with a reverse communication link of the apparatus, if the temperature of the power amplifier exceeds a threshold level.

18. The method of claim 15, further comprising:
determining a relation between the surface temperature of the apparatus and the temperature of power amplifier, and
setting, according to the relation, thresholds related to states of a temperature sensor used for monitoring the temperature of power amplifier.

19. The method of claim 1, wherein adjusting the at least one QoS aspect comprises:
triggering data throttling on an uplink of the apparatus that lowers at least one of a transmit power or a data rate of the apparatus, if a temperature of a power amplifier associated with the apparatus measured over time exceeds a threshold level, and wherein
the data throttling on the uplink keeps the surface temperature of the apparatus below a defined limit.

20. The method of claim 1, further comprising:
stopping requests for a Reverse Shared Channel (R-SCH), if at least one of the one or more temperatures exceeds a threshold level;
discarding an extended supplemental channel assignment message (ESCAM); and
resuming processing of the R-SCH, if the at least one of the one or more temperatures becomes lower than the threshold level.

21. The method of claim 1, further comprising:
transferring execution of one or more functions from the one or more parts to one or more other parts of the apparatus, if the one or more temperatures exceed one or more thresholds.

22. The method of claim 1, wherein:
monitoring the one or more temperatures of the one or more parts comprises monitoring a temperature of a battery of the apparatus; and
adjusting the at least one QoS aspect of the apparatus based on the one or more temperatures of the one or more parts comprises reducing a charge current of the battery or disabling charging of the battery, if the temperature of the battery exceeds a threshold.

23. An apparatus for wireless communications, comprising:
a first circuit configured to monitor estimated one or more powers dissipated by one or more parts of the apparatus over a period of time and one or more temperatures of the one or more parts; and
a second circuit configured to adjust at least one Quality of Service (QoS) aspect of the apparatus based on the monitored estimated one or more powers and monitored one or more temperatures of the one or more parts, wherein the adjusting is performed based on a known function between the estimated one or more powers, a duration of time, and a surface temperature of the apparatus.

24. The apparatus of claim 23, wherein the second circuit is also configured to:
reduce at least one of a transmit power or a data rate of the apparatus.

25. The apparatus of claim 24, wherein:
the data rate comprises a data rate of at least one of a 1×EV-DO (1 times Evolution-Data Optimized), 1×RTT (1 times Radio Transmission Technology), Long Term Evolution (LTE), or Evolved High-Speed Packet Access (HSPA+) wireless communications standard.

26. The apparatus of claim 24, further comprising:
a third circuit configured to recover the data rate to a value before the adjustment, if at least one temperature of at least one of the one or more parts of the apparatus is below a first threshold.

27. The apparatus of claim 24, further comprising:
a third circuit configured to adjust the data rate, if at least one temperature of at least one of the one or more parts of the apparatus is above a first threshold and below a second threshold; and
a fourth circuit configured to turn off at least one internal circuit associated with the at least one temperature, if the at least one temperature is above the second threshold.

28. The apparatus of claim 27, further comprising:
a fifth circuit configured to disable one or more advanced receiver techniques at the apparatus, if the at least one temperature is above the first threshold and below the second threshold.

29. The apparatus of claim 28, further comprising:
a sixth circuit configured to activate a further reduction of the at least one of transmit power or data rate, if the at least one temperature is above the first threshold and below the second threshold for a defined period of time.

30. The apparatus of claim 28, wherein the one or more advanced receiver techniques comprises at least one of receive diversity, interference cancellation, or a mitigation technique applied on a Central Processing Unit (CPU) of the apparatus.

31. The apparatus of claim 23, further comprising:
a third circuit configured to monitor the surface temperature of the apparatus; and
a fourth circuit configured to trigger a control mechanism to reduce the surface temperature, if the surface temperature exceeds a threshold level.

32. The apparatus of claim 31, wherein the threshold level is based on an ambient temperature associated with the apparatus.

33. The apparatus of claim 23, further comprising:
a fifth circuit configured to measure one or more electrical currents associated with one or more internal circuits of the apparatus, wherein
the one or more temperatures of the one or more parts are based on the one or more electrical currents, and
adjusting the at least one QoS aspect of the apparatus based on the monitored estimated one or more powers and the monitored one or more temperatures of the one or more parts comprises triggering a control mechanism to reduce at least one of a transmit power or a data rate of the apparatus, if any of the one or more electrical currents exceeds a threshold level.

34. The apparatus of claim 33, wherein the control mechanism comprises:
limiting the at least one QoS aspect by lowering power dissipation of the one or more internal circuits.

35. The apparatus of claim 23, further comprising:
a third circuit configured to decrease at least one of one or more clock frequencies of one or more internal circuits of the apparatus or one or more voltages of the one or more internal circuits, if one or more internal temperatures associated with the one or more internal circuits exceed one or more threshold levels.

36. The apparatus of claim 35, further comprising:
a fourth circuit configured to increase the one or more clock frequencies of the one or more internal circuits, if the one or more internal temperatures are below one or more other threshold levels.

37. The apparatus of claim 23, wherein the first circuit is also configured to:
monitor a temperature of a power amplifier associated with the apparatus; and
monitor a temperature of a baseband circuitry of the apparatus, and
wherein the estimated one or more powers dissipated by the one or more parts of the apparatus over the period of time are based on the temperature of power amplifier and the temperature of baseband circuitry.

38. The apparatus of claim 37, wherein the second circuit is also configured to:
adjust a data rate associated with a forward and reverse communication link of the apparatus, if the temperature of the baseband circuitry exceeds a threshold level.

39. The apparatus of claim 37, wherein the second circuit is also configured to:
adjust a data rate associated with a reverse communication link of the apparatus, if the temperature of the power amplifier exceeds a threshold level.

40. The apparatus of claim 37, further comprising:
a third circuit configured to determine a relation between the surface temperature of the apparatus and the temperature of power amplifier, and
a fourth circuit configured to set, according to the relation, thresholds related to states of a temperature sensor used for monitoring the temperature of power amplifier.

41. The apparatus of claim 23, wherein the second circuit is also configured to:
trigger data throttling on an uplink of the apparatus that lowers at least one of a transmit power or a data rate of the apparatus, if a temperature of a power amplifier associated with the apparatus measured over time exceeds a threshold level, and wherein
the data throttling on the uplink keeps the surface temperature of the apparatus below a defined limit.

42. The apparatus of 25, further comprising:
a fifth circuit configured to stop requests for a Reverse Shared Channel (R-SCH), if at least one of the one or more temperatures exceeds a threshold level;
a sixth circuit configured to discard an extended supplemental channel assignment message (ESCAM); and
a seventh circuit configured to resume processing of the R-SCH, if the at least one of the one or more temperatures becomes lower than the threshold level.

43. The apparatus of claim 23, further comprising:
a fifth circuit configured to transfer execution of one or more functions from the one or more parts to one or more other parts of the apparatus, if the one or more temperatures exceed one or more thresholds.

44. The apparatus of claim 23, wherein:
monitoring the one or more temperatures of the one or more parts comprises monitoring a temperature of a battery of the apparatus; and
adjusting the at least one QoS aspect of the apparatus based on the one or more temperatures of the one or more parts comprises reducing a charge current of the battery or disabling charging of the battery, if the temperature of the battery exceeds a threshold.

45. An apparatus for wireless communications, comprising:
means for monitoring estimated one or more powers dissipated by one or more parts of the apparatus over a period of time;
means for monitoring one or more temperatures of the one or more parts; and
means for adjusting at least one Quality of Service (QoS) aspect of the apparatus based on the monitored estimated one or more powers and monitored one or more temperatures of the one or more parts, wherein the adjusting is performed based on a known function between the estimated one or more powers, a duration of time, and a surface temperature of the apparatus.

46. The apparatus of claim 45, wherein the means for adjusting the at least one QoS aspect comprises:
means for reducing at least one of a transmit power or a data rate of the apparatus.

47. The apparatus of claim 46, wherein:
the data rate comprises a data rate of at least one of a 1×EV-DO (1 times Evolution-Data Optimized), 1×RTT (1 times Radio Transmission Technology), Long Term Evolution (LTE), or Evolved High-Speed Packet Access (HSPA+) wireless communications standard.

48. The apparatus of claim 46, further comprising:
means for recovering the data rate to a value before the adjustment, if at least one temperature of at least one of the one or more parts of the apparatus is below a first threshold.

49. The apparatus of claim 46, wherein the means for reducing the at least one of transmit power or data rate of the apparatus comprises:
means for adjusting the data rate, if at least one temperature of at least one of the one or more parts of the apparatus is above a first threshold and below a second threshold; and
means for turning off at least one internal circuit associated with the at least one temperature, if the at least one temperature is above the second threshold.

50. The apparatus of claim 49, further comprising:
means for disabling one or more advanced receiver techniques at the apparatus, if the at least one temperature is above the first threshold and below the second threshold.

51. The apparatus of claim 50, further comprising:
means for activating a further reduction of the at least one of transmit power or data rate, if the at least one temperature is above the first threshold and below the second threshold for a defined period of time.

52. The apparatus of claim 50, wherein the one or more advanced receiver techniques comprises at least one of receive diversity, interference cancellation, or a mitigation technique applied on a Central Processing Unit (CPU) of the apparatus.

53. The apparatus of claim 45, further comprising:
means for monitoring the surface temperature of the apparatus; and
means for triggering a control mechanism to reduce the surface temperature, if the surface temperature exceeds a threshold level.

54. The apparatus of claim 53, wherein the threshold level is based on an ambient temperature associated with the apparatus.

55. The apparatus of claim 45, further comprising:
means for measuring one or more electrical currents associated with one or more internal circuits of the apparatus, wherein
the one or more temperatures of the one or more parts are based on the one or more electrical currents, and
adjusting the at least one QoS aspect of the apparatus based on the monitored estimated one or more powers and the monitored one or more temperatures of the one or more parts comprises triggering a control mechanism to reduce at least one of a transmit power or a data rate of the apparatus, if any of the one or more electrical currents exceeds a threshold level.

56. The apparatus of claim 55, wherein the control mechanism comprises:
limiting the at least one QoS aspect by lowering power dissipation of the one or more internal circuits.

57. The apparatus of claim 45, further comprising:
means for decreasing at least one of one or more clock frequencies of one or more internal circuits of the apparatus or one or more voltages of the one or more internal circuits, if one or more internal temperatures associated with the one or more internal circuits exceed one or more threshold levels.

58. The apparatus of claim 57, further comprising:
means for increasing the one or more clock frequencies of the one or more internal circuits, if the one or more internal temperatures are below one or more other threshold levels.

59. The apparatus of claim 45, wherein the means for monitoring the estimated one or more powers comprises:
means for monitoring a temperature of a power amplifier associated with the apparatus; and
means for monitoring a temperature of a baseband circuitry of the apparatus, and
wherein the estimated one or more powers dissipated by the one or more parts of the apparatus over the period of time are based on the temperature of power amplifier and the temperature of baseband circuitry.

60. The apparatus of claim 59, wherein the means for adjusting the at least one QoS aspect comprises:
means for adjusting a data rate associated with a forward and reverse communication link of the apparatus, if the temperature of the baseband circuitry exceeds a threshold level.

61. The apparatus of claim 59, wherein the means for adjusting the at least one QoS aspect comprises:
means for adjusting a data rate associated with a reverse communication link of the apparatus, if the temperature of the power amplifier exceeds a threshold level.

62. The apparatus of claim 59, further comprising:
means for determining a relation between the surface temperature of the apparatus and the temperature of power amplifier, and
means for setting, according to the relation, thresholds related to states of a temperature sensor used for monitoring the temperature of power amplifier.

63. The apparatus of claim 45, wherein the means for adjusting the at least one QoS aspect comprises:
means for triggering data throttling on an uplink of the apparatus that lowers at least one of a transmit power or a data rate of the apparatus, if a temperature of a power amplifier associated with the apparatus measured over time exceeds a threshold level, and wherein the data throttling on the uplink keeps the surface temperature of the apparatus below a defined limit.

64. The apparatus of claim 45, further comprising:
means for stopping requests for a Reverse Shared Channel (R-SCH), if at least one of the one or more temperatures exceeds a threshold level;
means for discarding an extended supplemental channel assignment message (ESCAM); and
means for resuming processing of the R-SCH, if the at least one of the one or more temperatures becomes lower than the threshold level.

65. The apparatus of claim 45, further comprising:
means for transferring execution of one or more functions from the one or more parts to one or more other parts of the apparatus, if the one or more temperatures exceed one or more thresholds.

66. The apparatus of claim 45, wherein:
monitoring the one or more temperatures of the one or more parts comprises monitoring a temperature of a battery of the apparatus; and
adjusting the at least one QoS aspect of the apparatus based on the one or more temperatures of the one or more parts comprises reducing a charge current of the battery or disabling charging of the battery, if the temperature of the battery exceeds a threshold.

67. A non-transitory computer-readable medium comprising code for:
monitoring estimated one or more powers dissipated by one or more parts of an apparatus over a period of time;
monitoring one or more temperatures of the one or more parts; and
adjusting at least one Quality of Service (QoS) aspect of the apparatus based on the monitored estimated one or more powers and monitored one or more temperatures of the one or more parts, wherein the adjusting is performed based on a known function between the estimated one or more powers, a duration of time, and a surface temperature of the apparatus.

68. The non-transitory computer-readable medium of claim 67, further comprising code for:
reducing at least one of a transmit power or a data rate of the apparatus.

69. The non-transitory computer-readable medium of claim 68, wherein:
the data rate comprises a data rate of at least one of a 1×EV-DO (1 times Evolution-Data Optimized), 1×RTT (1 times Radio Transmission Technology), Long Term Evolution (LTE), or Evolved High-Speed Packet Access (HSPA+) wireless communications standard.

70. The non-transitory computer-readable medium of claim 68, further comprising code for:
  recovering the data rate to a value before the adjustment, if at least one temperature of at least one of the one or more parts of the apparatus is below a first threshold.

71. The non-transitory computer-readable medium of claim 68, further comprising code for:
  adjusting the data rate, if at least one temperature of at least one of the one or more parts of the apparatus is above a first threshold and below a second threshold; and
  turning off at least one internal circuit associated with the at least one temperature, if the at least one temperature is above the second threshold.

72. The non-transitory computer-readable medium of claim 71, further comprising code for:
  disabling one or more advanced receiver techniques at the apparatus, if the at least one temperature is above the first threshold and below the second threshold.

73. The non-transitory computer-readable medium of claim 72, further comprising code for:
  activating a further reduction of the at least one of transmit power or data rate, if the at least one temperature is above the first threshold and below the second threshold for a defined period of time.

74. The non-transitory computer-readable medium of claim 72, wherein the one or more advanced receiver techniques comprises at least one of receive diversity, interference cancellation, or a mitigation technique applied on a Central Processing Unit (CPU) of the apparatus.

75. The non-transitory computer-readable medium of claim 67, further comprising code for:
  monitoring the surface temperature of the apparatus; and
  triggering a control mechanism to reduce the surface temperature, if the surface temperature exceeds a threshold level.

76. The non-transitory computer-readable medium of claim 75, wherein the threshold level is based on an ambient temperature associated with the apparatus.

77. The non-transitory computer-readable medium of claim 67, further comprising code for:
  measuring one or more electrical currents associated with one or more internal circuits of the apparatus, wherein the one or more temperatures of the one or more parts are based on the one or more electrical currents, and
  adjusting the at least one QoS aspect of the apparatus based on the monitored estimated one or more powers and the monitored one or more temperatures of the one or more parts comprises triggering a control mechanism to reduce at least one of a transmit power or a data rate of the apparatus, if any of the one or more electrical currents exceeds a threshold level.

78. The non-transitory computer-readable medium of claim 77, wherein the control mechanism comprises:
  limiting the at least one QoS aspect by lowering power dissipation of the one or more internal circuits.

79. The non-transitory computer-readable medium of claim 67, further comprising code for:
  decreasing at least one of one or more clock frequencies of one or more internal circuits of the apparatus or one or more voltages of the one or more internal circuits, if one or more internal temperatures associated with the one or more internal circuits exceed one or more threshold levels.

80. The non-transitory computer-readable medium of claim 79, further comprising code for:
  increasing the one or more clock frequencies of the one or more internal circuits, if the one or more internal temperatures are below one or more other threshold levels.

81. The non-transitory computer-readable medium of claim 67, further comprising code for:
  monitoring a temperature of a power amplifier associated with the apparatus; and
  monitoring a temperature of a baseband circuitry of the apparatus, and
  wherein the estimated one or more powers dissipated by the one or more parts of the apparatus over the period of time are based on the temperature of power amplifier and the temperature of baseband circuitry.

82. The non-transitory computer-readable medium of claim 81, further comprising code for:
  adjusting a data rate associated with a forward and reverse communication link of the apparatus, if the temperature of the baseband circuitry exceeds a threshold level.

83. The non-transitory computer-readable medium of claim 81, further comprising code for:
  adjusting a data rate associated with a reverse communication link of the apparatus, if the temperature of the power amplifier exceeds a threshold level.

84. The non-transitory computer-readable medium of claim 81, further comprising code for:
  determining a relation between a surface temperature of the apparatus and the temperature of power amplifier, and
  setting, according to the relation, thresholds related to states of a temperature sensor used for monitoring the temperature of power amplifier.

85. The non-transitory computer-readable medium of claim 67, further comprising code for:
  triggering data throttling on an uplink of the apparatus that lowers at least one of a transmit power or a data rate of the apparatus, if a temperature of a power amplifier associated with the apparatus measured over time exceeds a threshold level, and wherein
  the data throttling on the uplink keeps a surface temperature of the apparatus below a defined limit.

86. The non-transitory computer-readable medium of claim 67, further comprising code for:
  stopping requests for a Reverse Shared Channel (R-SCH), if at least one of the one or more temperatures exceeds a threshold level;
  discarding an extended supplemental channel assignment message (ESCAM); and
  resuming processing of the R-SCH, if the at least one of the one or more temperatures becomes lower than the threshold level.

87. The non-transitory computer-readable medium of claim 67, further comprising code for:
  transferring execution of one or more functions from the one or more parts to one or more other parts of the apparatus, if the one or more temperatures exceed one or more thresholds.

88. The non-transitory computer-readable medium of claim 67, wherein:
  monitoring the one or more temperatures of the one or more parts comprises monitoring a temperature of a battery of the apparatus; and adjusting the at least one QoS aspect of the apparatus based on the one or more temperatures of the one or more parts comprises reducing a charge current of the battery or disabling charging of the battery, if the temperature of the battery exceeds a threshold.

* * * * *